(12) United States Patent
Kamath et al.

(10) Patent No.: US 11,889,353 B2
(45) Date of Patent: *Jan. 30, 2024

(54) EFFICIENT METHOD TO LOAD-BALANCE WIRELESS NETWORKS WITH MULTI-BAND INTERFACE CONTROLLERS

(71) Applicant: Cypress Semiconductor Corporation, San Jose, CA (US)

(72) Inventors: Vinayak Kamath, Mangalore (IN); Vinoth Sampath, Bangalore (IN)

(73) Assignee: Cypress Semiconductor Corporation, San Jose, CA (US)

(*) Notice: Subject to any disclaimer, the term of this patent is extended or adjusted under 35 U.S.C. 154(b) by 397 days.

This patent is subject to a terminal disclaimer.

(21) Appl. No.: 16/667,632

(22) Filed: Oct. 29, 2019

(65) Prior Publication Data

US 2020/0107224 A1    Apr. 2, 2020

Related U.S. Application Data

(63) Continuation of application No. 16/211,578, filed on Dec. 6, 2018, now Pat. No. 10,499,282.
(Continued)

(51) Int. Cl.
*H04W 76/15*    (2018.01)
*H04W 28/086*    (2023.01)
(Continued)

(52) U.S. Cl.
CPC .......... *H04W 28/086* (2023.05); *H04B 1/005* (2013.01); *H04W 48/20* (2013.01); *H04W 76/15* (2018.02)

(58) Field of Classification Search
None
See application file for complete search history.

(56) References Cited

U.S. PATENT DOCUMENTS 7,577,453 B2    8/2009 Matta
8,655,278 B2    2/2014 Laroche et al.
(Continued)

FOREIGN PATENT DOCUMENTS

CN    102843302 A    12/2012
CN    107040897 A    8/2017
(Continued)

OTHER PUBLICATIONS

Cypress Semiconductor Automotive Wireless, Driving the Connected Car Experience; pp. 3.
(Continued)

*Primary Examiner* — Kodzovi Acolatse

(57) ABSTRACT

Implementations disclosed describe techniques to optimize performance of wireless networks having multi-band connectivity by steering devices connecting to the network to preferred frequency ranges. In an example embodiment, a method may comprise receiving, a first probe request from a client device at a first access point of the wireless network, establishing a first association between the first access point and the client device, the first access point operating at a first frequency range of the wireless network, receiving a second probe request from the client device at a second access point, the second access point operating at a second frequency range of the wireless network, sending a transition request over the first access point to instruct the client device to transition to the second access point, and establishing a second association between the second access point and the client device.

21 Claims, 9 Drawing Sheets

Related U.S. Application Data

(60) Provisional application No. 62/738,151, filed on Sep. 28, 2018.

(51) Int. Cl.
*H04B 1/00* (2006.01)
*H04W 48/20* (2009.01)

(56) References Cited

U.S. PATENT DOCUMENTS

| | | | |
|---|---|---|---|
| 9,432,848 | B2 | 8/2016 | Iyer et al. |
| 9,750,022 | B2 | 8/2017 | Liu et al. |
| 10,009,132 | B2 | 6/2018 | Knowles |
| 10,051,581 | B2 | 8/2018 | Wang et al. |
| 2011/0082905 | A1 | 4/2011 | Wentink et al. |
| 2012/0243474 | A1* | 9/2012 | Iyer ............... H04W 12/122 370/328 |
| 2012/0275320 | A1* | 11/2012 | Iyer ............... H04W 72/085 370/252 |
| 2012/0322481 | A1* | 12/2012 | Laroche ........... H04W 48/16 455/509 |
| 2014/0059218 | A1 | 2/2014 | Ganu et al. |
| 2015/0358885 | A1 | 12/2015 | Choi |
| 2015/0382348 | A1* | 12/2015 | Hara ............. H04W 72/0453 370/329 |
| 2016/0007278 | A1* | 1/2016 | Gupta ............. H04W 48/20 370/329 |
| 2016/0374086 | A1* | 12/2016 | Gupta ............. H04W 36/22 |
| 2017/0111854 | A1* | 4/2017 | Ho ............... H04W 36/165 |
| 2017/0142725 | A1* | 5/2017 | Mohaupt ............ H04W 4/40 |
| 2018/0084471 | A1 | 3/2018 | Emmanuel et al. |
| 2018/0176284 | A1 | 6/2018 | Strater et al. |
| 2018/0184346 | A1* | 6/2018 | Wang ............... H04W 36/06 |
| 2018/0278697 | A1 | 9/2018 | Cariou et al. |
| 2018/0352493 | A1 | 12/2018 | Strater et al. |
| 2018/0352497 | A1* | 12/2018 | Taskin ............ H04W 36/08 |
| 2019/0357080 | A1* | 11/2019 | Shanbhag ......... H04W 48/16 |

FOREIGN PATENT DOCUMENTS

| | | |
|---|---|---|
| EP | 3116279 | 3/2017 |
| WO | 2014145073 A1 | 9/2014 |
| WO | 2016092121 A1 | 6/2016 |
| WO | 2018096383 A1 | 5/2018 |
| WO | 2018096384 A1 | 5/2018 |

OTHER PUBLICATIONS

International Search Report for International application No. PCT/US2019/044836 dated Oct. 21, 2019, 2 pages.
USPTO Final Rejection for U.S. Appl. No. 16/211,578 dated May 3, 2019, 13 pages.
USPTO Non-Final Rejection for U.S. Appl. No. 16/211,578 dated Feb. 13, 2019; 12 pages.
USPTO Notice of Allowance for U.S. Appl. No. 16/211,578 dated Jul. 17, 2019, 7 pages.
Written Opinion of the International Searching Authority for International application No. PCT/US2019/044836, dated Oct. 21, 2019, 9 pages.

* cited by examiner

EFFICIENT METHOD TO LOAD-BALANCE WIRELESS NETWORKS WITH MULTI-BAND INTERFACE CONTROLLERS

RELATED APPLICATIONS

This application is a Continuation Application of U.S. patent application Ser. No. 16/211,578, filed on Dec. 6, 2018, which claims the priority and benefit of U.S. Provisional Application No. 62/738,151, filed on Sep. 28, 2018, all of which are incorporated herein in their entirety.

TECHNICAL FIELD

The disclosure pertains to wireless networks; more specifically, to optimizing performance of wireless networks having multi-band connectivity by steering devices connecting to the network to preferred bands.

BACKGROUND

Wireless networks often have to provide connectivity to multiple devices through the same access point corresponding to a particular radio frequency band. As additional devices are joining a network, the throughput of the access point of the network does not increase, leading to overcrowding of the network, decreasing the speed of connection to each or some of the devices, and decreased quality of user experience. Even when a base station of the network is capable of supporting connectivity at two different frequency bands and the devices connecting to the network are capable of using either one of the frequencies, some of the devices may still prefer connecting at the same band as a default option. This may result in the underutilization of the second band. Accordingly, the additional functionality provided by the second band may not improve the overall performance of the network.

DETAILED DESCRIPTION

Figure 1:
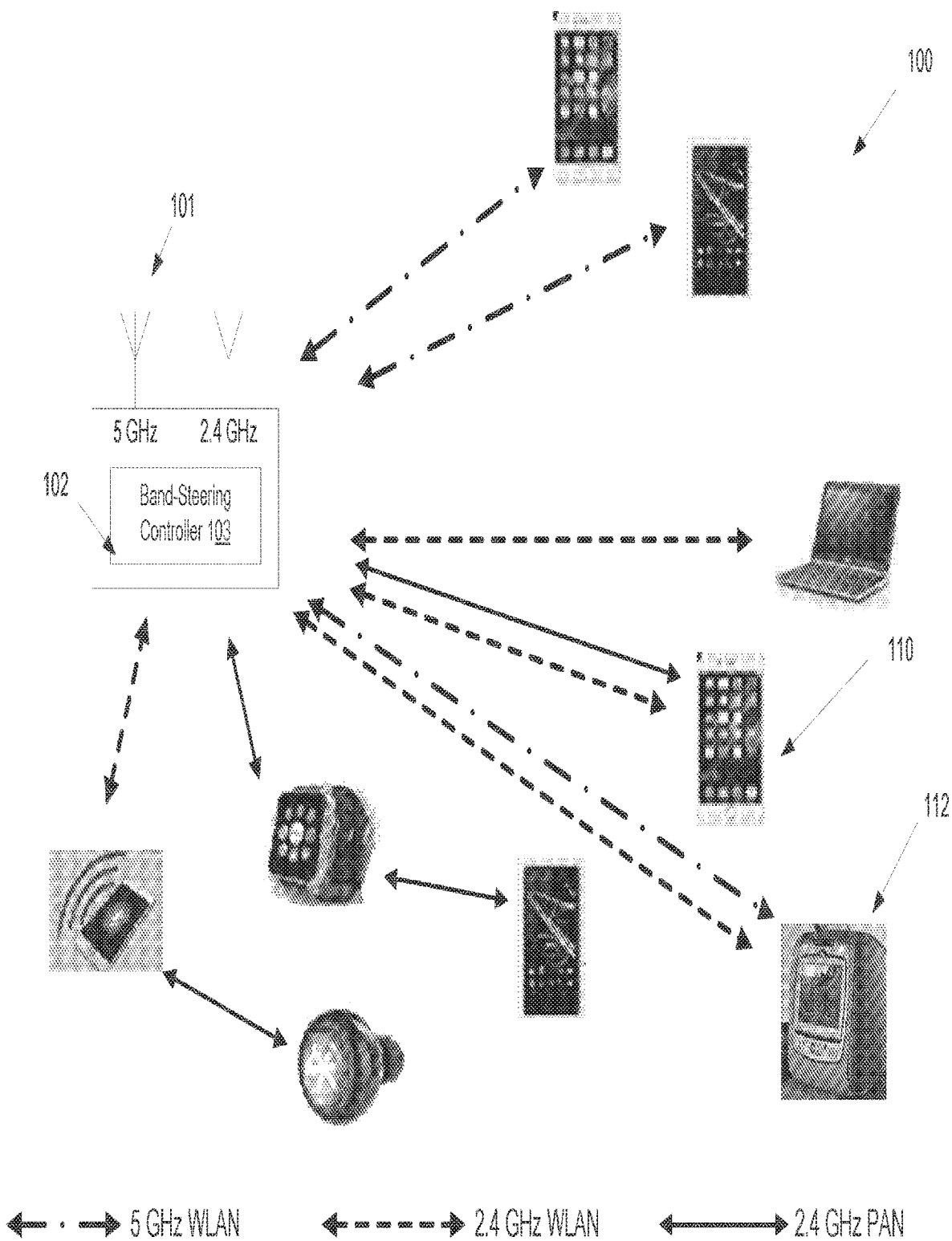
FIG. 1 illustrates one exemplary implementation of multiple client devices supported by a wireless network whose performance may be optimized by band-steering to a preferred band.

Aspects of the present disclosure are directed at optimizing performance of wireless networks having multi-band connectivity by utilizing band-steering controllers capable of steering devices connecting to the network to preferred bands. A band-steering controller of a network may be capable of providing connecting devices (e.g., client devices) with multiple access points (APs) that utilize different radio frequencies. When a client device attempts to connect to a base station having a band-steering controller, the band-steering controller may determine that the client device is capable of connecting to multiple APs and initiate a band-steering process to ensure that the client device is connected to an AP corresponding to a preferred frequency band.

Modern wireless network environments often have to provide wireless connectivity to a large number of client devices using wireless local area networks (WLANs), such as the WiFi® networks, in one implementation. In one illustrative example, a wireless network may be located in an automotive environment where the base station is integrated into an automobile (a passenger car, a sport-utility vehicle, a truck, a passenger bus) and where client devices may include laptops, tablets, smart phones, headrest screens, and the like. Several occupants of the automobile may use the same automotive network, each occupant possibly using multiple client devices. Some of the client devices may access internet for infotainment and impose significant demands on the bandwidth of the wireless connection, e.g., during video downloads or live streaming.

Various client devices may use different protocols for wireless connection at a number of radio frequencies. For example, IEEE 802.11b and 801.11g devices are capable of connecting at 2.4 GHz band whereas 802.11n, 802.11ac, and 802.11ax devices may be capable of using both 2.4 GHz and 5 GHz bands. Even though wireless environments typically use one or both of these two bands, some protocols may use other frequencies. For example, 802.11 ad protocol uses the 60 GHz band, which is capable of supporting-within a distance of about 10 feet-a larger bandwidth and a bit stream rate than is higher than bit streams of either 2.4 GHz or 5 GHz bands.

Automotive WLAN environments, especially for infotainment, are currently dominated by the 2.4 GHz band, which was historically the first carrier for the family of IEEE 802.11 protocols. Client devices seeking to connect to a wireless network often choose the 2.4 GHz AP even though other (e.g. 5 GHz) APs are available. A client device may choose the 2.4 GHz AP upon detecting that the received signal strength indicator (RSSI) shows that the power of the radio signal is the strongest for the 2.4 GHz band than for other bands. In other instances, client devices may base their choice of an AP on the ease of discoverability of the AP. As a consequence, many (and, often, the majority) of wireless connections between the base station and client devices may occur at 2.4 GHz even though the 5 GHz AP may have a higher bandwidth. This overcrowding of a single band may be further exacerbated by the simultaneous presence of a personal area network (PAN). PANs, such as Bluetooth® networks, in one illustrative example, may use the same 2.4 GHz band, which leads to additional crowding of this band. Additionally, the PAN and the WLAN may sometimes use overlapping channels of the 2.4 GHz band resulting in interference between the two networks and a degraded performance of both.

Overcrowding a single band and underutilizing other available bands may detrimentally affect performance of client devices and detract from the experience of the users of those devices. At the same time, the benefits of the 2.4 GHz connectivity, such as a longer range compared with the 5 GHz band, may not justify such overcrowding in a relatively compact automotive environment. Yet, many devices, especially older "legacy devices," may not be capable of steering, on their own, to a different band even if that band is less crowded or has a larger bandwidth. The implementations disclosed describe a dual-band controller to detect a client device seeking connection to a WLAN and steer it the client device to a preferred band of the WLAN. In one implementation, steering may be towards the 5 GHz band, although steering to other bands may be implemented in the same way. The dual-band controller may detect a request from a client device to join the network, verify that the client device is capable of connecting to multiple bands, and steer the client device to the preferred band.

The implementations described herein overcome the challenges and problems set forth above. More specifically, the implementations disclosed optimize performance of dual-band capable networks, by increasing utilization of available bandwidths, increasing the overall throughput of the network bands, preventing overcrowding of certain bands, reducing possible interference between client devices, and improving quality of user experience.

FIG. 1 illustrates one exemplary implementation of multiple client devices supported by a wireless network whose performance may be optimized by band-steering to a preferred band. The wireless network 100, such as WLAN, in one implementation, may have a base station 102 equipped with one or more antennas 101 supporting receiving and transmitting signals within a first frequency range (which may include the 2.4 GHz band) and a second frequency range (which may include the 5 GHz band). In one implementation, the first frequency range may correspond to the range of frequencies commonly referred to as the 2.4 GHz regulatory domain, such as the range from 2.400 to 2,485 MHz. or any sub-range within this frequency range. In one implementation, the second frequency range may correspond to the range of frequencies commonly referred to as the 5 GHz regulatory domain, such as the US range from 5.180 to 5,874 MHz, or any sub-range within this frequency range. In some implementations, a broader range of frequencies may be used. For example, the European regulations may allow frequencies down to 5.160 MHz. In other implementations, other frequency ranges may be used, such as a range including the 60 GHz range or any other range used for wireless networking. In some implementations, the first frequency range and the second frequency range may be broad enough to contain multiple regulatory bands. For example, in one implementation, the first frequency range may include both the 2.4 GHz and 5 GHz bands whereas the second frequency range may contain the 60 GHz band. For such implementations, the notation 2.4 GHz should be understood as a shorthand for the first frequency range, namely any range where overcrowding is to be avoided. Similarly, the notation 5 GHz should be understood as a shorthand for the second frequency range, namely any range into which the connecting devices are to be steered. In some implementations, the 5 GHz band may be within the first frequency range whereas 2.4 GHz may be within the second frequency range.

The base station 102 may be equipped with two (or more) separate antennas 101, in some implementations. In other implementations, a single antenna 101 may be used for both (or all) frequency ranges. For example, the antenna 101 may be a multiple-input and multiple-output (MIMO) antenna. The base station 102 may have a band-steering controller 103 to enforce preferred connectivity in the wireless network 100, in one implementation. The band-steering controller 103 may be integrated into the base station 102 or be located outside the base station 102 and communicate with the base station electronically or wirelessly.

The wireless network 100 may support multiple client devices. For example, some client devices may establish WLAN associations with the base station 102 using the 2.4 GHz frequency range (depicted with dashed lines) whereas other devices may establish associations using the 5 GHz frequency range (depicted with dot-dashed lines). Additionally, some of the client devices may establish PAN associations (depicted with solid lines) with the base station 102 and/or with other devices. In some implementations, PAN associations may use the 2.4 GHz frequency band. Some devices may be capable of establishing associations of different types with the base station 102. For example, a smartphone 110 may be capable of accessing the base station 102 using either WLAN or PAN or both. The base station may use the same 2.4 GHz antenna for WLAN and PAN or may have separate antennas for each of these networks. A headrest screen 112 (by way of example) may be capable of accessing the base station 102 via an AP for the 2.4 GHz band and/or the 5 GHz band. Other devices of the wireless network 100 may similarly be capable of dual 2.4/5 GHz connectivity even if this is not indicated explicitly. The band-steering controller 103 may enforce preferred connectivity between the 2.4 GHz band and 5 GHz band (and/or between additional bands, if present) according to the implementations discussed below.

The wireless network 100 may be implemented in an automotive environment or in any other environment that may benefit from band-steering functionality. Such environments may include wireless networks in passenger airplanes, trains, ships, or any other transportation environments. The wireless network 100 may also be implemented outside transportation environments, for example, in hotels, at conferences, and so on.

Figure 2:
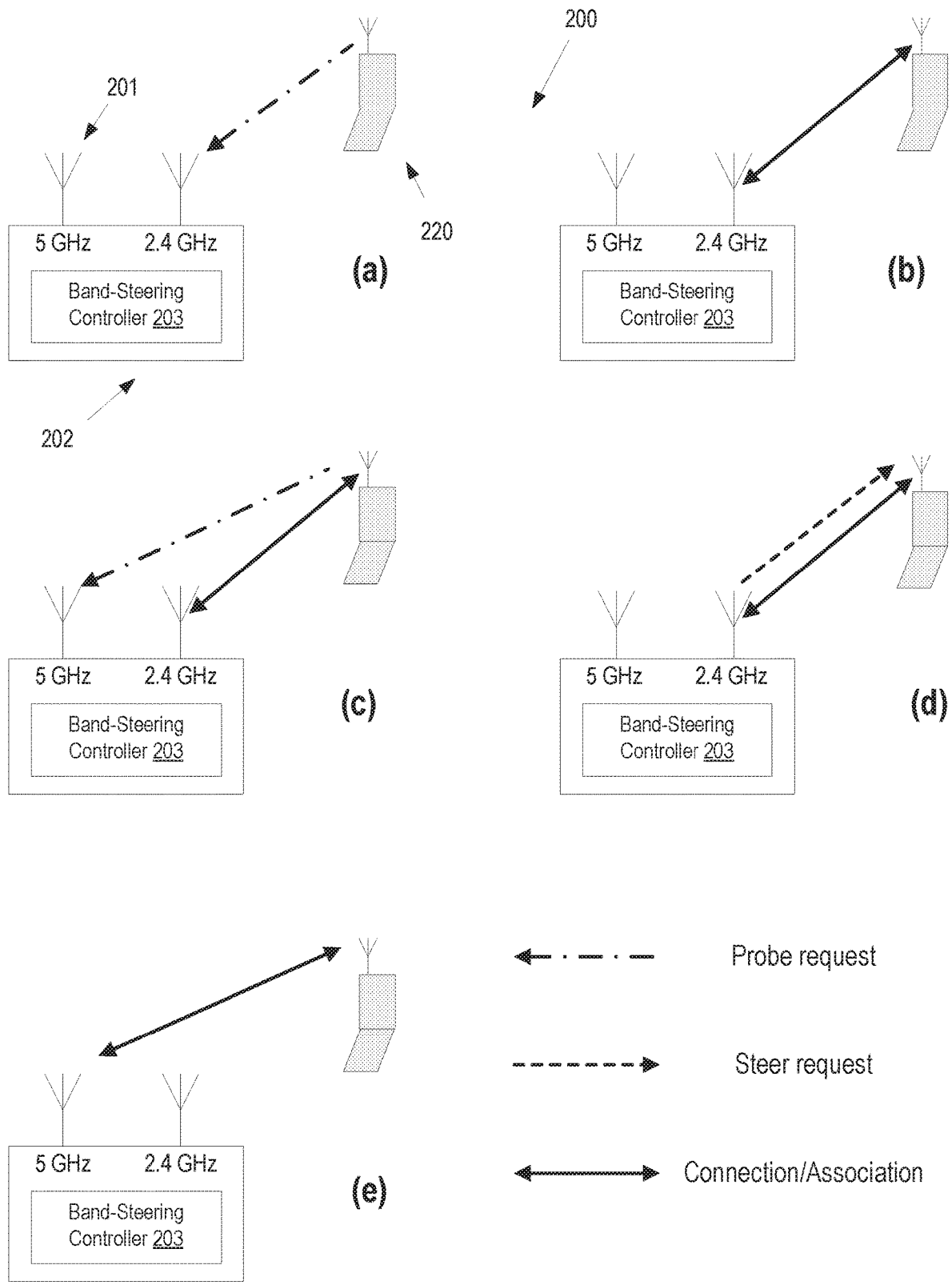
FIG. 2 illustrates one possible implementation of the band-steering process enabled by a band-steering controller.

FIG. 2 illustrates one possible implementation of the band-steering process 200 as implemented by the band-steering controller 103 for a dual-band access system. The numbering of components in FIG. 2 may correlate with the numbering of components in FIG. 1 and/or other FIGs. For example, in some implementations, the base station 202 in FIG. 2 may be the same as the base station 102 of FIG. 1, and the band-steering controller 203 in FIG. 1 may be the same as the band-steering controller (BSC) 103 in FIG. 1. The base station 202 or the band-steering controller 203 may have two or more APs to enable wireless connectivity of client devices 220 to the WLAN supported by the base station 202. A first AP of the controller 203 may use the first frequency range of 2.4 GHz whereas a second AP of the controller may use the second frequency range of 5 GHz, in one implementation. An AP is defined as a set of hardware and software components of the controller 203 facilitating wireless connection functionality for the corresponding frequency range. In some implementations, multiple APs may be implemented on a single device (e.g, as a single chip.) In some implementations, all components of different APs (such as antennas, front-end modules, amplifiers, physical radio layers, media-access control layers) may be separately implemented. In some implementations, different APs may share some of the components. For example, two AP may use the same antenna (such as a MIMO antenna), the same physical radio layer, and/or the same processor (such as a CPU). Two APs may be supported by the same software. In some instances, a first AP may be implemented as a first AP device (e.g., as a first chip) and a second AP implemented as a second AP device (e.g., as a second chip). In other implementations, the first AP device and the second AP device may be communicatively coupled to each other. In some implementations, the first AP device and the second AP device may be attached to the same motherboard of the BSC 203.

In one implementation, the base station 202 may be implemented as part of a car infotainment system supporting multiple client devices. The band-steering controller 203 may notify potential client devices (such as a phone 220) of the availability of the APs of the WLAN. For example, BSC 203 may periodically broadcast, through one or more antennas 201, beacon frames (data packets) containing an AP's service set identifier (SSID), security settings, and the standards (protocols) that the AP supports. The beacon frames may identify the dual-band access system as a peer-to-peer (P2P) group owner. Different APs of the same BSC may have different SSID, in one implementation. Different APs of the same controller may broadcast beacon frames independently from one another, or in a correlated fashion. In one implementation, different APs of the same BSC may have the same SSID which may be the SSID for the whole WLAN. The BSC 203 or the base station 202 may broadcast information frames for both (or all) APs supported by the BSC on different bands of 202. When a client device 220 (e.g. the smartphone 120) detects a beacon frame from the BSC 203, a client device 220 may initiate a wireless connection with the WLAN. For example, the client device 220 may receive instructions from its user to initiate a wireless connection upon informing the user of the availability of the WLAN, in one implementation. In another implementation, the client device 220 may store instructions from the user to connect to the WLAN automatically, upon detecting that the WLAN's SSID(s) is contained in the list of the authorized SSIDs.

To establish a wireless connection, the client device may send a probe request, as in FIG. 2(*a*) to the BSC 203 and establish an association with the first AP of the BSC, as indicated schematically in FIG. 2(*b*). For example, the BSC 203 may receive from the client device 220 an authentication request frame and send back an authentication response frame. The BSC 203 may then receive from the client device 220 an association request frame and send back an association response frame to verify that the client device 220 and the base station 202 have compatible wireless functionalities (such as supported protocols, data rates, encryption standards, and so on). The authentication request and/or association request frames may contain an identifier of the client device 220, such as a media access control address (MAC address) of the client device 220. An additional secure authentication, such as WEP, WPA, or WPA2, may follow after the exchange of the association request.

After the association between the BSC 203 and the client device 220 is established, the BSC 203 may assess whether the association occurred at the first AP (disfavored because of the risk of overloading and/or lower bandwidth) or the second (preferred) AP. If the association has occurred at the second AP, the BSC 203 may take no further action, in one implementation. In another implementation, once the BSC 203 has learned that the client device 220 is capable of wireless connectivity at the second frequency range corresponding to the second AP, the BSC may store the MAC address of the client device 220 in memory on the black list of devices to be denied connection to the first AP. As a result, when the client device 220 attempts to connect to the BSC 203 again in the future (or re-connect, if the association with the BSC 203 is temporarily lost), the client device 220 may not be allowed to connect to the first AP, in one implementation. For example, upon receiving the client device's MAC address with the authentication/association request frame(s), the BSC 203 may respond with a de-authentication frame for the first AP, and therefore force the client device to seek association with the second (preferred) AP. If the BSC 203 has access to a volatile memory, the black list associated with the first AP may be stored until the next reboot of the system. In some implementations, where the BSC 203 has access to a non-volatile memory, the black list for the first AP may be stored there persistently.

If, however, the association with the client device 220 has occurred at the first AP (e.g., operating at 2.4 GHz), the BSC 203 may initiate steering of the client device away from the first AP and towards the second AP (e.g., operating at 5 GHz). In some implementations, the BSC 203 may wait for a probe request from the client device 220 for an association with the second AP, as indicated in FIG. 2(*c*). For example, the BSC may add the MAC address of the client device 220 to a monitor list associated with the second AP. The client device 220 may continue sending probe requests even though the association with the first AP has been successfully established. The client device may be doing so pre-emptively, in case the first association with the first AP is interrupted. Upon receiving a probe request for the second AP, the BSC 203 may locate the MAC address of the client device 220 in the monitor list. The BSC may then send a transition request, such as a steer request illustrated in FIG. 2(*d*), over the first AP to instruct the client device 220 to transition to the second AP.

In one implementation, the transition request may include a transition request frame, such as a Basic Service Set (BSS) Transition Management Request supported by Wireless Network Management standard (802.11v) amendment to the IEEE 802.11 that allows configuration of client devices during their association to a wireless network. A BSS Transition Management Request may be used in an unsolicited fashion by the BSC 203 and transmitted to the client device 220 without having the client device first send a BSS Transition Management Query. The BSS Transition Management Request can prompt the client device to disassociate from the first AP. The transition request may contain the list of preferred APs to which the client device 220 may re-associate. In some implementations, this list may contain the second AP. The client device 220 may accept the transition request by sending back to the BSC 203 a BSS Transition Management Response. In those implementations, where re-association is optional for the client device 220, the BSC 203 may "encourage" such re-association by setting a "dissociation imminent" bit in its BSS Transition Management Request. If the client device 220 ignores the transition request, the BSC 203 may nevertheless send a de-authentication frame and add the client device 220 to the black list of devices to be denied connection to the first AP. As a result, when the client device 220 attempts to re-connect to the BSC 203, the client device 220 may be forced to establish a connection with the second AP and may not be allowed to connect to the first AP. In some implementations, the client device may be blacklisted from using the first AP only after a first successful association with the second AP even though it is forcefully dis-associated from the former. In some implementations, the BSC 203 may maintain a "first AP-only" or "legacy" list of those client devices that have never sent probe requests for the second AP. Entries in the legacy list (e.g., MAC addresses of client devices) may be deleted once a probe request for the second AP is detected by the BSC 203. In some implementations, the BSC 203 is not to send transition requests to the client devices on the legacy list.

In some implementations, the client device 220 may stop sending further probe requests after the association with the first AP is established, so that the situation illustrated in FIG. 2(c) may sometimes not occur. Yet the client device 220 may nonetheless be capable of connecting to the first AP. For example, the client device 220 may have sent a probe request for the second AP prior to, or concurrently with, the request for the first AP shown in FIG. 2(a). The client device 220 may have associated with the first AP, as the default option, even though a positive authentication response had been received earlier by the client device from the BSC 203 over the second AP. To facilitate transitions to the second AP of such "silent" client devices, the BSC 203 may store probe request from the client device 220 (and other client devices) in memory in the "history list." Upon establishing the association with the client device 220 over the first AP, the BSC 203 may access the history list and retrieve from it the entries containing prior probe requests that came from the same MAC address as the MAC address of the client device 220. The BSC 203 may search these entries for an indication that at least one of the prior probe requests referenced a frequency band of the second AP (e.g., the second frequency range). Upon discovering such a reference, the BSC 203 may proceed with sending the transition request in the same fashion as described above, as if a probe request from the client device 220 arrived after the association with the first AP. To save memory, in some implementations, the entries in the history list may only be stored for a limited amount of time, for example, for a time comparable with the typical time needed for establishing a WLAN connection, which may be a few seconds, in some implementations. In other implementations, only a limited number of entries may be supported by the history list, with the new entries written over the oldest entries already on the list.

In some implementations, the BSC 203 may send a BSS Transition Management Request even when no request at the second frequency range has been detected from the client device 220. In such implementations, it may be optimal not to set the "dissociation imminent" bit and make the dis-association transition voluntary subject to an affirmative BSS Transition Management Response from the client device 220 that the re-association through the second AP is possible.

Upon receiving a positive confirmation that the client device 220 is willing to transition to the second AP or in those instances where the BSC 203 has made a decision to terminate association with the first AP regardless of the consent from the client device 220, the BSC 203 may send a de-authentication frame to the client device 220 through the first AP, in some implementations. In one implementation, the BSC 203 may wait for an authentication request from the client device 220 to be received through the second AP to repeat the exchange of the authentication/association frames and establish the association with the second AP, as illustrated in FIG. 2(e).

After the client device has successfully transitioned from the association with the first AP, as in FIG. 2(b), to the association with the second AP, as in FIG. 2(e), the BSC 203 may update the monitor list and remove the MAC address of the client device 220 from the list. In another implementation, the BSC 203 may remove the MAC address of the client device already after the receipt of the first probe request at the second AP, as in FIG. 2(c). In some implementations, the BSC 203 may place the MAC address of the client device 220 on the list of second AP-capable devices, so that whenever a new association is established with the client device 220 in the future over the first (or a third, fourth, and so on) AP, the BSC may send a steer request asking the client device 220 to transition to the second AP without waiting for any probe requests for the second AP from the client device 220. In some implementations, after the client device 220 has been successfully steered to connect to the second AP, the BSC may store the MAC address of the client device 220 in the black list of devices to be denied association with the first AP in the future.

Figure 3:
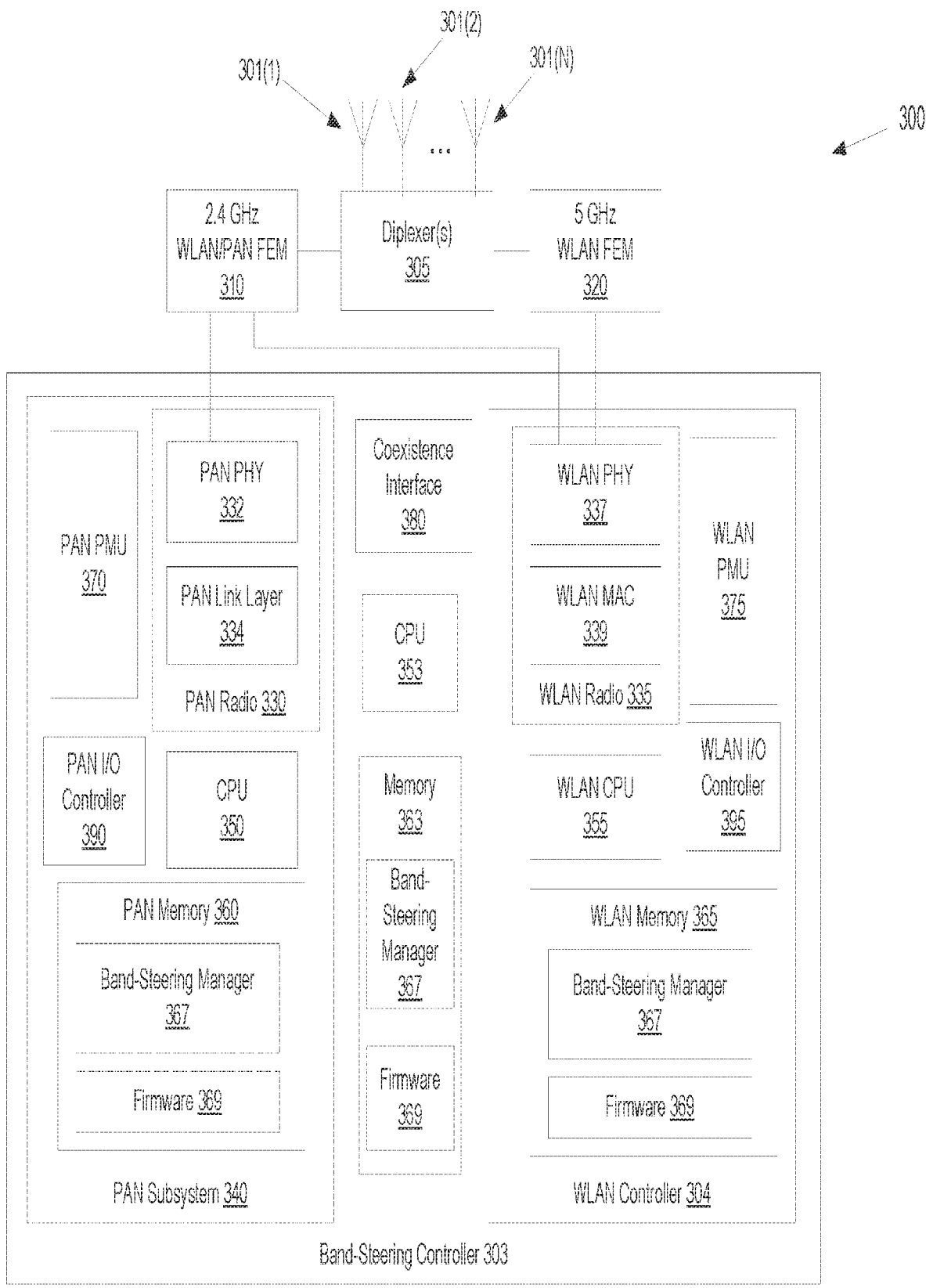
FIG. 3 is a block diagram of one exemplary implementation of the band-steering controller capable of implementing the band-steering process of FIG. 2.

FIG. 3 is a block diagram of one exemplary implementation 300 of a band-steering controller capable of implementing the band-steering process of FIG. 2. The BSC 303 may be implemented as an integrated circuit (IC) device (e.g., disposed on a single semiconductor die) that provides dual-band access functionality, such as dual-AP, for the WLAN (such as one illustrated in FIG. 1) and further enable the capability to steer client devices seeking wireless associations with the WLAN to preferred frequency ranges. As disclosed above in reference to FIG. 2, an AP is defined as a set of hardware/software components with a functionality for supporting wireless connectivity for a given frequency range, rather than as a specific set of particular hardware and/or software components. The term "dual-AP" should be understood as referring to the functionality that enables more than one AP on the same controller; the number of APs may be two in some implementations, but may be more than two (e.g., three, four, and so on) in other implementations. The steering capability may refer to a functionality that discourages associations with the first AP corresponding to the first frequency range and promotes preferred connectivity to the second AP corresponding to the second frequency range. In some implementations, steering may be between two APs even if more than two APs are supported by the BSC 303. In some implementations, the steering may be enabled towards a single AP from multiple other APs. In some implementations, the steering may be enabled from multiple overcrowded (or low-bandwidth) APs towards multiple preferred APs. In some implementations, there may be a hierarchy of preferred APs. In such implementations, steering of a client device connecting (or already connected) to the WLAN may occur towards one of the preferred APs based on the current load (e.g., the number of client devices associated with the AP and traffic through the AP) of various preferred APs.

BSC 303 may support various types of wireless networks. In one implementation, BSC 303 may include the WLAN (e.g. a Wi-Fi® local area network) controller 304 and the PAN (e.g. a Bluetooth® personal area network) subsystem 340. The WLAN may support two APs, for example, the first AP corresponding to the 2.4 GHz frequency range and the second AP corresponding to the 5 GHz frequency range, in one implementation. The PAN may operate within the same first frequency range, in one implementation. The BSC 303 may use (or be connected to) one or more antennas 301(1), 301(2) . . . 301(N), to receive and transmit radio waves within the frequency ranges used by the APs of the BSC 303.

The number of antennas 301 may be the same as the number of APs of the WLAN, in one implementation. In other implementations, the number of antennas 301 may be more than the number of APs. Some APs may use multiple antennas 301. In some implementations, the PAN subsystem 340 may use a designated antenna (or multiple antennas). In some implementation, the PAN subsystem 340 may use antennas 301 that are shared with the WLAN controller 304. In some implementations, a single multi-input multi-output (MIMO) antenna may be used.

The signal received by the antenna(s) 301 may be fed via a diplexer 305 to the front-end module (FEM) 310 for the first frequency range (e.g., serving both WLAN and PAN) and to the FEM 320 for the second frequency range (serving WLAN, in one implementation). In some implementations, a multiplexer may be used in place of the diplexer 305, for example where more than two APs are supported by the BSC 303. In some implementations, no diplexer or multiplexer may be used and each antenna may have a separate FEM. The FEMs 310 and 320 may include filters (e.g., band-pass filters), low-noise radio-frequency amplifiers, down-conversion mixer(s), and other circuitry (analog and/or digital) that may be used to process modulated signals received by the antenna into signals suitable for input into the baseband analog-to-digital converters. Similarly, the FEM 310 and 320 may process analog signals output to the antennas 301 for transmission. The FEM 310 and 320 may be connected to a WLAN radio 335. The WLAN radio 335 may be a dual-band radio providing the WLAN controller 304 with the capability to concurrently process signals through two WLAN FEMs operating at two different frequency ranges. The WLAN radio 335 may include a physical layer component (WLAN PHY) 337, such as 802.11ac PHY, that may transform the received digital signal to frames (data packets) that can then be fed into a WLAN media access control layer (WLAN MAC) 339, such as 802.11ac MAC. The WLAN PHY 337 may include intermediate-frequency amplifiers, analog-to-digital converters, inverse Fourier transform modules, deparsing modules, interleavers, error correction modules, scramblers, PHY-MAC padding layers, and other components. In some implementations, all PHY components may be integrated into the same chip. In some implementations, the WLAN MAC 339 may be integrated with WLAN PHY 337 on the same chip. In other implementation, some components. e.g. the analog-to-digital converters and/or intermediate-frequency amplifiers, may be executed by separate circuitry of the WLAN radio 335 but outside the WLAN PHY 337. In some implementations, some of the WLAN PHY 337 components may be combined with the FEMs components.

In some implementations, WLAN MAC 339 may not be a part of the WLAN radio 335 but instead may be implemented on a WLAN central processing unit (WLAN CPU) 355 using a logical thread of the WLAN CPU 355. In other implementations. WLAN MAC 339 may be implemented as a component separate from both the WLAN CPU 355 and the WLAN radio 335. In one implementation, the interaction of the WLAN components may happen as follows. The WLAN CPU 355 executing a logical link control (LLC), in communication with a WLAN memory 365, may prepare a data packet, such as a MAC service data unit, and provide it to the WLAN MAC 339, which may add additional bytes (e.g., header bytes and/or tail bytes) to form an appropriate 802.11ac MAC protocol data unit before sending the protocol data unit to the WLAN PHY 337 for digital-to-analog processing, intermediate-frequency amplification, and filtering, in one implementation. The analog signal output by the WLAN PHY 337 may then be provided to the WLAN FEMs 310 and WLAN FEM 320 for radio-frequency processing and transmission through one or more of the antennas 301. The reverse process may occur when an incoming radio-frequency signal is received through the antenna(s) 301.

The dual-AP functionality may be provided by some or all of the above disclosed components. In one implementation, the disclosed components of the WLAN controller 304 may be implemented on a single Real Simultaneous Dual Band (RSDB) chip. In one implementation, the WLAN CPU 355 may allocate a first logical processor (or CPU core) to enable the first AP corresponding to the first frequency range (e.g., 2.4 GHz) and a second logical processor (or CPU core) to enable the second AP corresponding to the second frequency range (e.g., 5 GHz). In another implementation, a single logical processor (or CPU core) may execute multiple APs. The logical processors may execute LLCs for the corresponding APs, prepare MAC service data units for these APs. and provide the service data units to the WLAN MAC(s) 339 for processing into MAC protocol data units and transmitting the protocol data units through the WLAN PHY 337 and WLAN FEMs 310 and 320. A single WLAN MAC 339 may be processing and outputting MAC data for both APs, in one implementation. In another implementation, multiple WLAN MACs 339 may be processing and outputting MAC data, where a separate AP-assigned WLAN MAC 339 communicates with the AP-assigned logical processor of the WLAN CPU 355. In some implementations, WLAN MACs 339 may be implemented as software executed by the WLAN CPU 355. e.g., by the corresponding logical processors.

The double output of the WLAN MAC(s) 339—namely, the first AP MAC protocol data units and the second AP MAC protocol data units—may be fed to the WLAN PHY(s) 337 for separate digital-to-analog processing and transmission, as described above. A single WLAN PHY 337 may be capable of processing and transmitting multiple AP data units, in one implementation. For example, the WLAN PHY 337, using the same circuitry and components, may be processing and transmitting data units for the first AP during a first set of discrete time intervals and for the second AP during a second set of discrete time intervals, so that there may be no overlap between the first time intervals and the second time intervals. In another implementation, there may be multiple separate WLAN PHYs for different APs. For example, a first WLAN PHY 337 may have dedicated 2.4 GHz components for the first AP, such as intermediate-frequency amplifiers, analog-to-digital converters, interleavers, error correction modules, scramblers. Likewise, a second WLAN PHY 337 may have dedicated 5 GHz components for the second AP. The analog signals produced by double WLAN PHY 337 may then be output to separate WLAN FEMs 310 and 320, mixed by the diplexer 305 and transmitted through one or more of the antennas 301 concurrently. The received signals corresponding to two APs may be processed in a similar fashion in a reverse order.

The disclosed implementations allow scalability to support more than two APs. For example, the number of the WLAN FEMs, may be equal to the number of APs, the diplexer 305 may be replaced with a multiplexer, and the number of dedicated WLAN PHY layers 337 may be equal to the number of APs, in one implementation. A single WLAN MAC 339 may be used to process data units for multiple APs or separate dedicated WLAN MAC layers 339 may be implemented, with a separate logical processor of the WLAN CPU 355 assigned to each WLAN MAC 339.

The band-steering functionality may be enabled by a band-steering manager (BSM) 367, in one implementation. The BSM 367 may be a set of executable instructions loaded into WLAN memory 365 from the firmware 369 after boot. The BSM 367 may be executed by the WLAN CPU 355. The BSM 367 may cause the WLAN CPU 355 to execute the band-steering process illustrated in FIG. 2. More specifically, in one implementation, the BSM 367 may cause the WLAN CPU 355 to detect a probe request from the client device 220 at the frequency of the first AP point and a probe request at the frequency of the second AP, establish an association of the client device with the BSC 303 over the first AP, generate a steer (transition) request to the client device 220 over the first AP to transition to the second AP, authenticate/associate the client device 220 at the second AP, and de-associate the client device 220 from the first AP.

The WLAN controller 304 may also include a WLAN power management unit (PMU) 375 which may manage clock/reset and power resources for the other components of the WLAN controller 304. The WLAN controller 304 may further contain a WLAN input/output (I/O) controller 395 to enable communications with external devices and structures. In some implementations, the WLAN I/O controller 395 may enable a general purpose I/O (GPIO) interface, a USB I²C module, an I²S and/or a PCM digital audio module, and other I/O components.

The BSC 303 may support multiple networks on the same platform, such as the RSDB chip, in one implementation. For example, in addition to the WLAN controller 304 enabling the WLAN, the BSC 303 may also include a PAN subsystem 340. The PAN subsystem 340 may enable the PAN, which may share one or more frequency ranges with the WLAN, for example the PAN may be operating in the first frequency range. In some implementations, the PAN may share the FEM 310 and one or more antennas 301 with the WLAN. In some implementations, the PAN subsystem 340 may have a dedicated PAN FEM. The shared WLAN/PAN FEM 310 may be providing/receiving signals to/from a PAN radio 330. The PAN radio 330 may be a single-band radio and include a PAN PHY layer 332 having components that may be similar to the components of the WLAN PHY layer 337. In some implementation, the PAN PHY 332 may have some components that the WLAN PHY 337 may lack or, vice versa, the PAN PHY 332 may have some additional components. In some implementations, the PAN PHY 332 may share some components with the WLAN PHY 337. The PAN PHY 332 may communicate with a PAN Link Layer 334 which may be a component of the PAN radio 330, in some implementations, or may be realized as a software component executed by the PAN CPU 350. The PAN Link Layer 334 may have a number of states, such as advertising, scanning, initiating, connection, standby. The PAN subsystem 340 may have a PAN memory 360, a PAN PMU 370, and a PAN I/O controller 390, which may server functions similar to the functions performed by their WLAN counterparts.

The BSC 303 may include a coexistence interface 380 to facilitate coexistence of the WLAN controller 304 and the PAN subsystem 340. Because the WLAN and the PAN may operate within the same frequency range and on the same device (e.g. chip), the coexistence interface 380 may help to resolve potential performance and reliability issues of both networks. For example, the coexistence interface 380 may mitigate interference between the networks through temporal, spatial, and frequency isolation, channel selection, and the like.

The WLAN memory 365 (and, similarly, the PAN memory 360) may include read-only memory (ROM) and/or random-access memory (RAM). In some implementation, memory may be shared between the WLAN controller 304 and the PAN subsystem 340, as shown by a memory 363, for example. In some implementations, the BSM 367 may be implemented in the PAN memory 360, as indicated by the corresponding dashed rectangle, or in the shared memory 363. Similarly, the firmware 369 may be stored in the PAN memory 360 and/or in the shared memory 363. In some implementation, the BSC 303 may have only one processor, such as the WLAN CPU 355, which serves both the WLAN and the PAN. In other implementations, only the PAN subsystem 340 may have a processor such as the CPU 350, which serves both the WLAN and the PAN whereas the WLAN controller 304 does not have a separate CPU. In one implementation, a shared CPU, such as a CPU 353 may be used whereas neither the WLAN controller 304 nor the PAN subsystem 340 has a separate processor.

Figure 4:
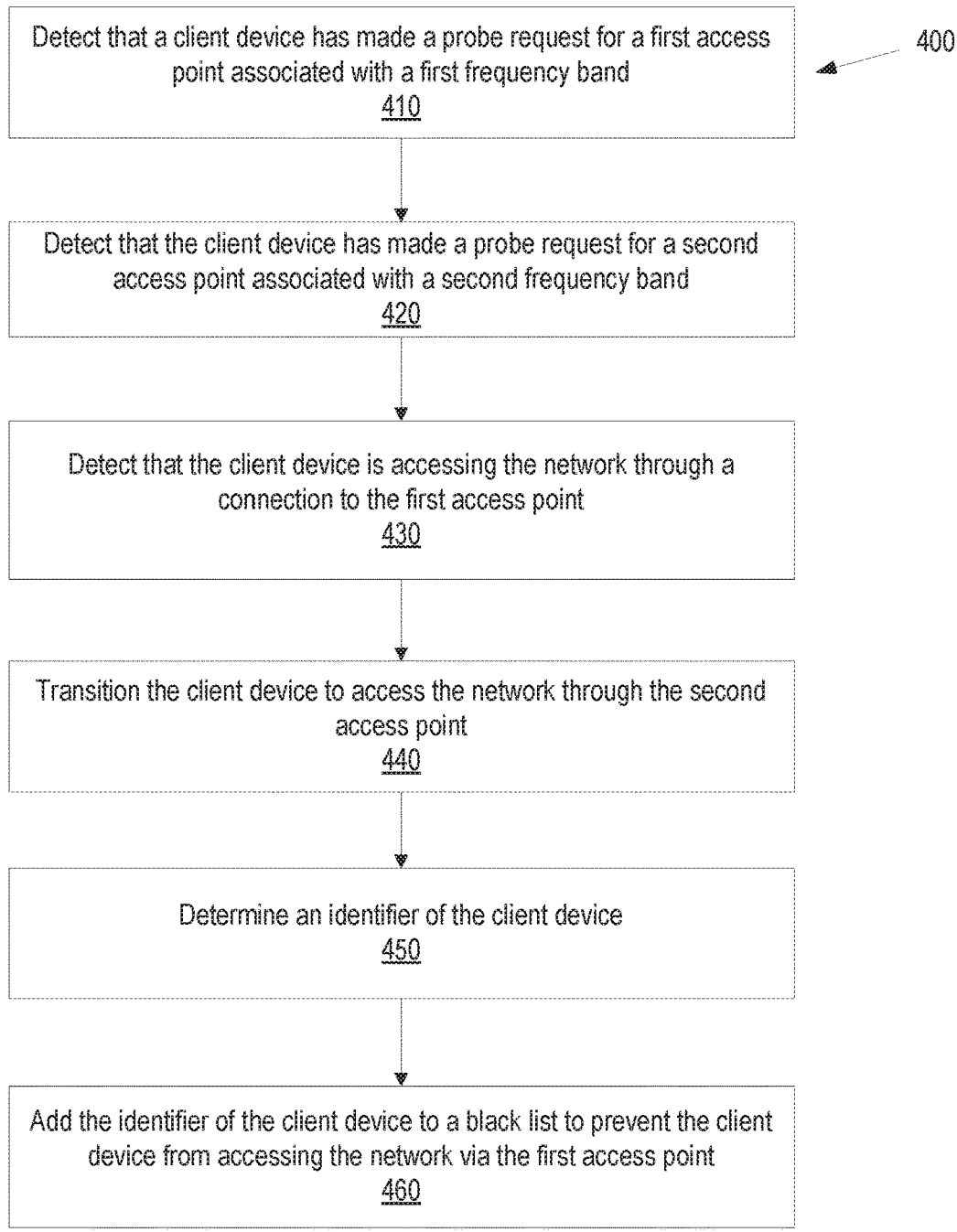
FIG. 4 is a flow diagram of an example method, enabled by a band-steering controller, of steering a client device attempting an association with a wireless local area network, according to one implementation.

FIG. 4 is a flow diagram 400 of an example method of steering a client device attempting an association with a WLAN, enabled by a band-steering controller, according to one implementation. Method 400 may be performed by a processing logic of the BSC 303 that may include hardware (e.g., circuitry, dedicated logic, programmable logic, microcode, etc.), software (such as operations being performed by the BSM 367), firmware or a combination thereof. The method 400 may include the BSC detecting that the client device, such as the client device 220 of FIG. 2, has made a probe request for a first AP of the BSC (410). For example, the BSC may receive from the client device an authentication request frame. The method 400 may also include the BSC detecting that the client device has made a probe request for a second AP of the BSC (420). The two requests may be detected in an arbitrary order. For example, the probe request for the second AP may precede the probe request for the first AP.

The method 400 may further include the BSC detecting that the client device is accessing the WLAN though the first AP (430). This may happen, in one implementation, because the client device has successfully authenticated a connection with the first AP of the BSC and has established an association with the first AP by exchanging a series of BSS authentication/association request frames with the BSC. In some implementations, the detection that the client device is accessing the network thorough the first AP may precede the detection that the client device has made a probe request for a second AP of the BSC. In other implementations, the detection that the client device is accessing the network thorough the first AP may be subsequent to the detection that the client device has made a probe request for a second AP of the BSC. In some implementations, the probe request for the second AP from the client device is unsolicited. In other implementations, the probe request may be caused by an authentication frame sent from the BSC to the client device.

After the probe request for the second AP has been detected by the BSC, the method 400 may continue with initiating a transition of the client device to access the network through the second AP (440). In one implementation, initiating the transition begins with BSC sending a BSS Transition Management Request prompt the client device to dis-associate from the first APs and re-associate through the second AP. In some implementations, the transition request may include a "dissociation imminent" bit. The method 400 may further include the BSC determining an identifier for the client device (450). In some implementations the identifier may include a media access control address (MAC address) of the client device. The MAC address of the client device may be read from the authentication/association frames sent by the client device. The method 400 may continue with the BSC adding the identifier of the client device to the black list to prevent the client device from accessing the network via the first AP (460). In some implementations, the blocks 450 and 460 may be performed after a successful association of the client device and the second AP is established so that the client device is verified to be capable of accessing the network through the second AP. In other implementations, the blocks 450 and 460 may be performed before or independently from the detection of access (block 430) or transition to the second AP (block 440), with the only prerequisite being a detection of a probe request for the second AP (block 420).

Figure 5:
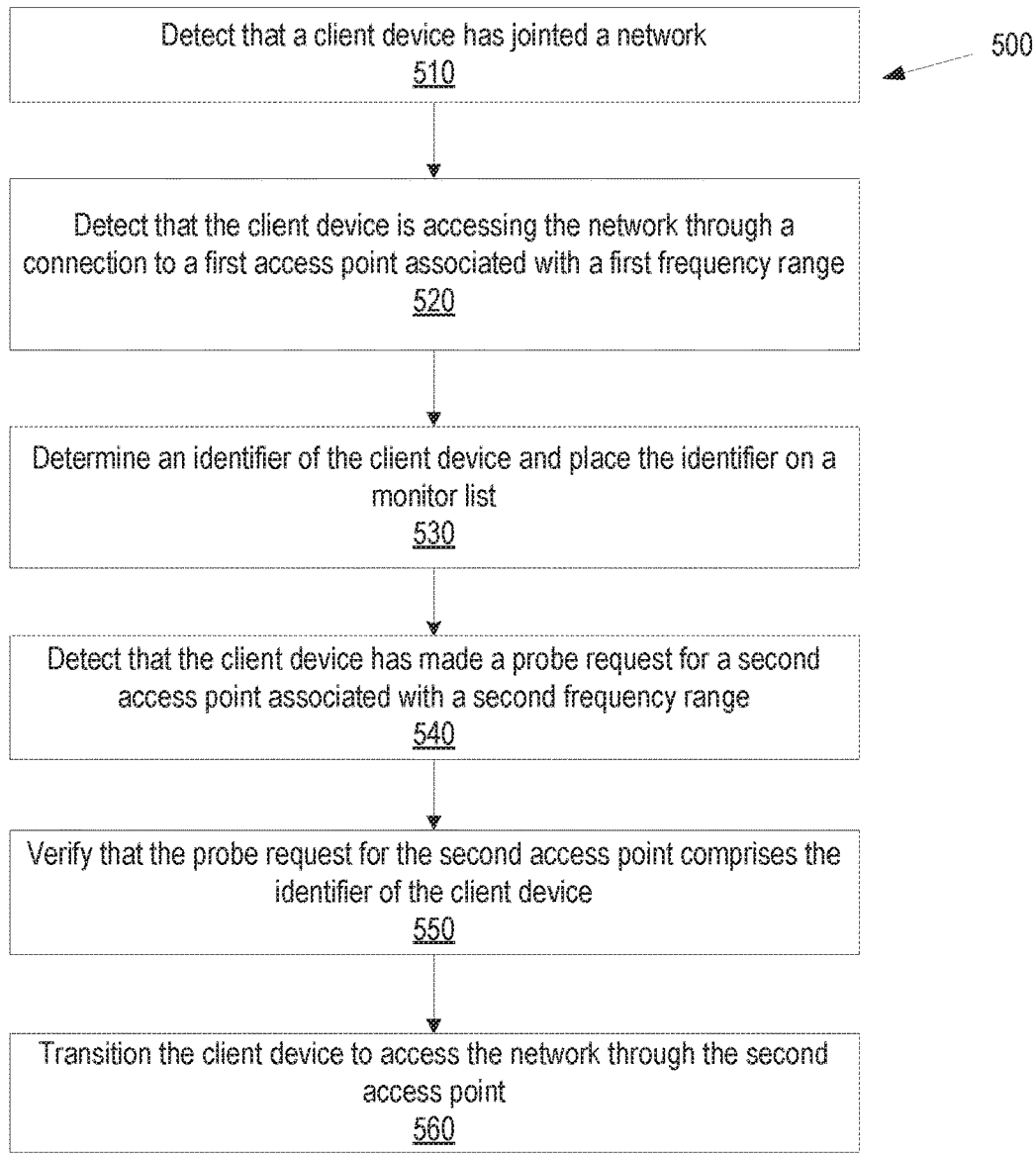
FIG. 5 is a flow diagram of an example method of steering a client device attempting an association with a wireless local area network, enabled by a band-steering controller, the method including placing the client device on a monitor list, according to one implementation.

FIG. 5 is a flow diagram of an example method 500 of steering a client device attempting an association with a WLAN, enabled by a band-steering controller, the method including placing the client device on a monitor list, according to one implementation. Method 500 may be performed by processing logic of the BSC 303 that may include hardware (e.g., circuitry, dedicated logic, programmable logic, microcode, etc.), software (such as operations being performed by the BSM 367), firmware or a combination thereof. The method 500 may begin with the BSC detecting that a client device has joined the network (510). For example, in one implementation, the BSC may determine that the client device has successfully authenticated a connection with the network.

The method 500 may continue with the BSC detecting that the client device is accessing the network through a connection to the first AP associated with a first frequency range (520). This may be performed similarly to the block 430 of the method 400. The method 500 may continue with determining an identifier of the client device (such as its MAC address), similar to the block 450 of the method 400, and placing the identifier on a monitor list (530). The monitor list may include the list of potential candidates (client devices) to be transitioned to the second AP. The method 500 may continue with the BSC detecting that the client device has made a probe request for the second AP associated with the second frequency range (540). The method 500 may continue with the BSC verifying that the probe request for the second AP includes the identifier for the client device (550). In some implementations, the BSC may compare the monitor list entries with the identifiers from the probe requests for the second AP received after the client device's association with the network. The method 500 may continue with transitioning the client device to access the network through the second AP (560), which may be accomplished similarly to how the corresponding block 440 is performed in the process 400.

Figure 6:
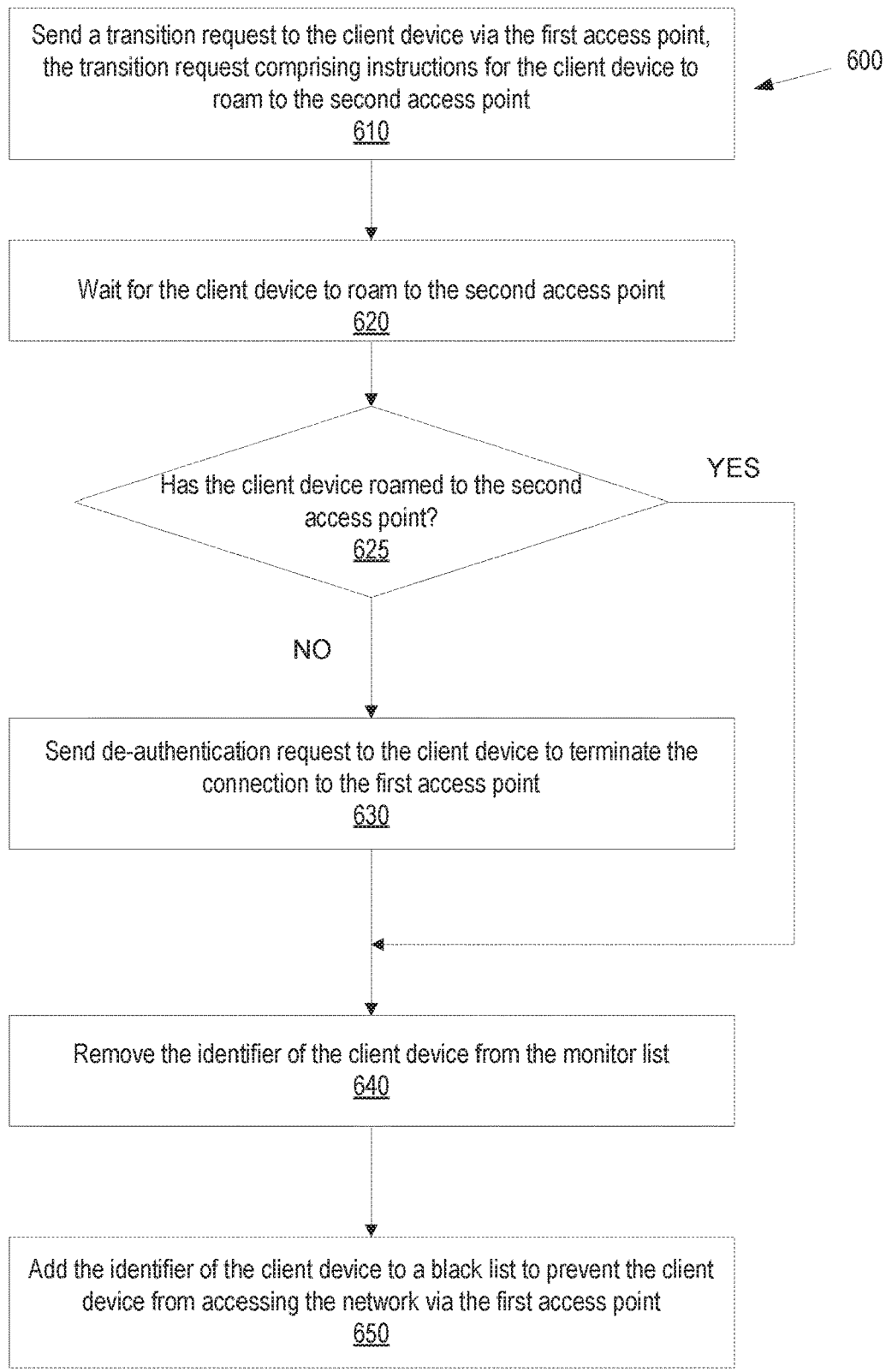
FIG. 6 is a flow diagram of an example method of transitioning a client device from a first access point of a wireless local area network to a second access point of the network, according to one implementation.

FIG. 6 is a flow diagram of an example method 600 of transitioning a client device from the first access point of a WLAN to a second access point of the WLAN, according to one implementation. Method 600 may be performed by processing logic of the BSC 303 that may include hardware (e.g., circuitry, dedicated logic, programmable logic, microcode, etc.), software (such as operations being performed by the BSM 367), firmware or a combination thereof. The method 600 may be executed as part of the method 400 (e.g., as block 440) or as part of the method 500 (e.g., as block 560), in some implementations. The method 600 may begin with the BSC sending a transition request to the client device, such as the client device 220, via the first AP (610). The transition request may include instructions for the client device to transition to the second AP. In some implementations, the instructions may include a 802.11v BSS Transition Management Request that allows configuration of client devices during their association to wireless networks. The method 600 may continue with the BSC waiting for the client device to transition to the second AP (620), in some implementations. For example, the BSC may wait for a set amount of waiting time to receive an indication that the transition has occurred. In some implementations, the BSC may be sending additional requests to transition to the second AP during the waiting time. For example, the additional requests may be sent at specified time intervals after the commencement of the waiting time.

At the decision-making block 625, the method 600 may determine if the client device has transitioned to the second AP. In some implementations, the band-steering manager 367 of the BSC may receive an indication from WLAN MAC 339 or WLAN CPU 355 that a probe request for the second AP received by the BSC includes the MAC address of the client device. The band-steering manager may receive further indication that the client device has exchanged authentication and/or association frames with the BSC through the second AP and that, therefore, the association of the client device with the second AP has been established. If such (or similar) confirmation that the client device has transitioned to the second AP has been received, the method 600 may continue with removing the client device (e.g., the MAC address of the client device) from the monitor list, in some implementations. If, however, no indication has been received within the set amount of waiting time, the method 600 may continue with the BSC sending a de-authentication request (such as a BSS de-authentication frame) to the client device to terminate its connection to the first AP, in some implementations (630). The implementation of block 630 may have the objective to force the client device to seek re-association with the second AP after the BSC determined (prior to the execution of the method 600. e.g., during block 420 of the method 400) the client device to be capable of accessing the WLAN through the second AP. The client device may be forewarned in advance that the de-authentication in imminent by setting the "de-association imminent" bit in the transition request of block 610. The method 600 may then proceed to remove the identifier of the client device address from the monitor list (640) in the same way as if the client device's dissociation from the first AP has been voluntary. The method 600 may then continue with adding the identifier of the client device to the black list for the first AP to prevent the client device from accessing the WLAN via the first AP in the future.

Figure 7A:
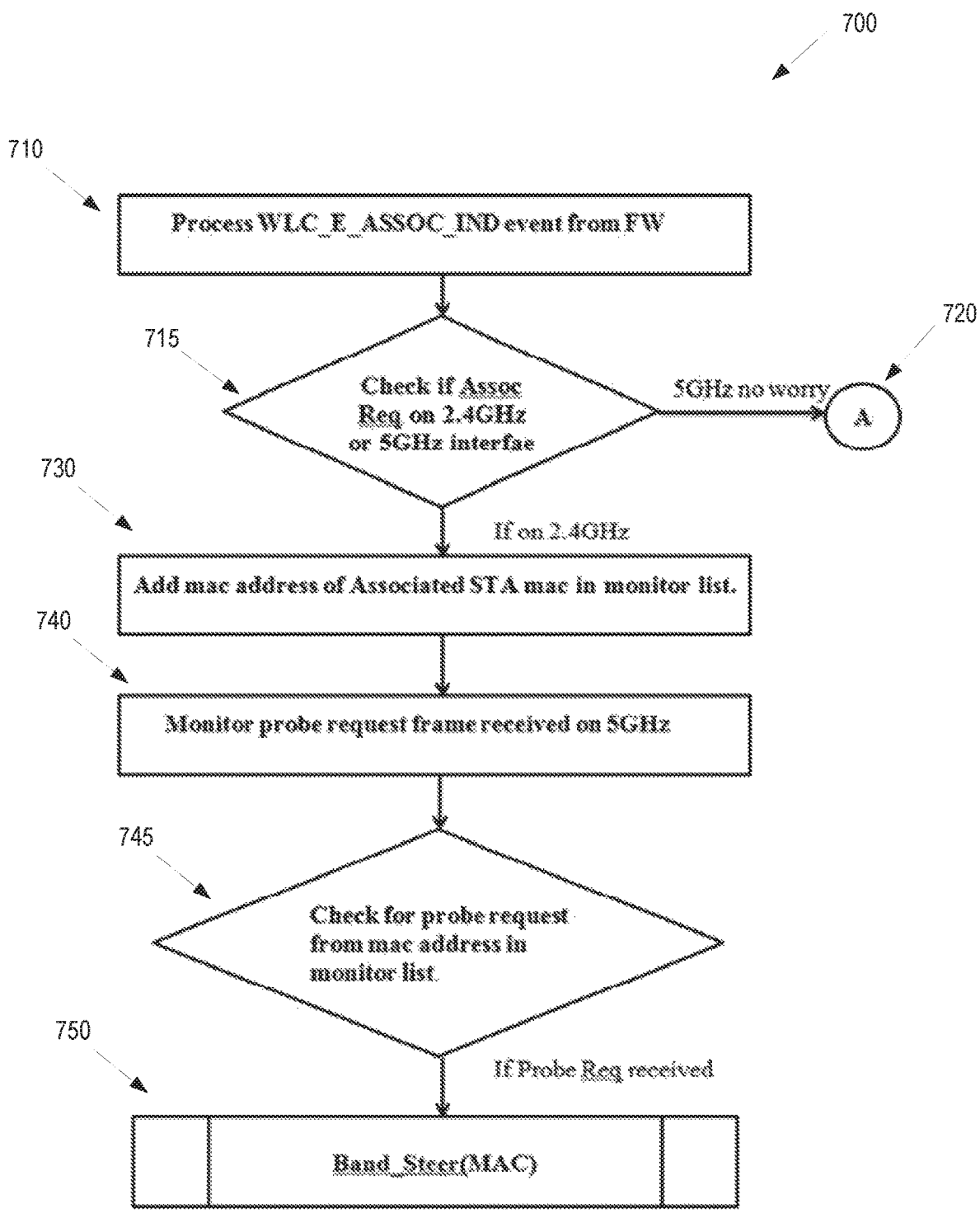
FIG. 7A and FIG. 7B illustrate a flow diagram of one possible implementation of a method, enabled by a band-steering controller, of steering a client device attempting an association with a wireless local area network, away from the association at 2.4 GHz and towards the association at 5 GHz, in one implementation.
Figure 7B:
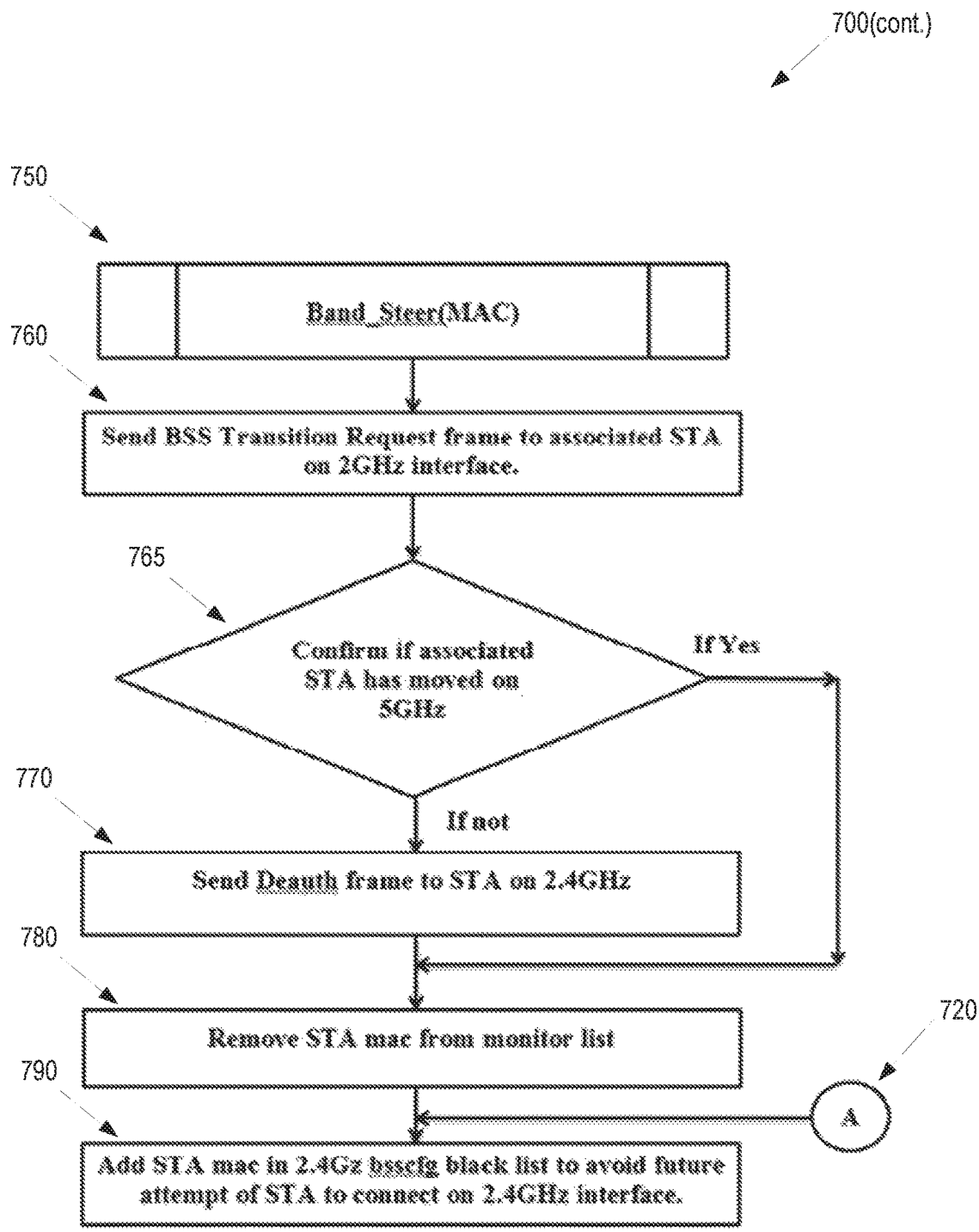

FIG. 7A and FIG. 7B illustrate a flow diagram of one possible implementation 700 of a BSC-enabled method of steering a client device attempting an association with a WLAN, away from the association with the first AP at 2.4 GHz and towards the association with the second AP at 5 GHz, in one implementation. The method 700 may utilize some blocks of the previously disclosed methods 400, 500, and 600. In one implementation, the method 700 may begin by detecting that the client device has associated with the WLAN, e.g., by receiving an indication that an event WLC_E_ASSOC_IND has occurred (710). The method may continue with determining if the association is at the first AP ("2.4 GHz interface") or at the second AP ("5 GHz interface") (715). If the association is at the first AP, the process may continue with placing the MAC address of the client device (referred to as "Associated Station") on the monitor list (730) and checking for probe requests for the second AP from the same MAC address (740). The probe requests may be checked proactively (after placing the MAC address on the monitor list) as well as retroactively (by retrieving the list of past requests from memory). In one implementation, if a probe request for the second AP is detected (745), the method 700 may continue with the band steering blocks (750) illustrated in FIG. 7B, which may correspond to the blocks of the method 600 disclosed above. For example, the method 700 may proceed with sending a transition request over the first AP (760), confirm that the client device has moved to the second AP (765), and remove the client device from the monitor list (780). If the client device has not moved to the second AP, the method 700 may continue with de-authenticating the client device at the first AP (770) before removing it from the monitor list. The method 700 may conclude with placing (e.g. using the BssCfg utility) the client device's MAC address on the black list for the first AP (790). If the initial association of the client device with the WLAN is with the second AP ("5 GHz interface"), the method 700 may skip the steering blocks of the method 700 and proceed (720) directly to adding the client device to the black list (790).

Figure 8:
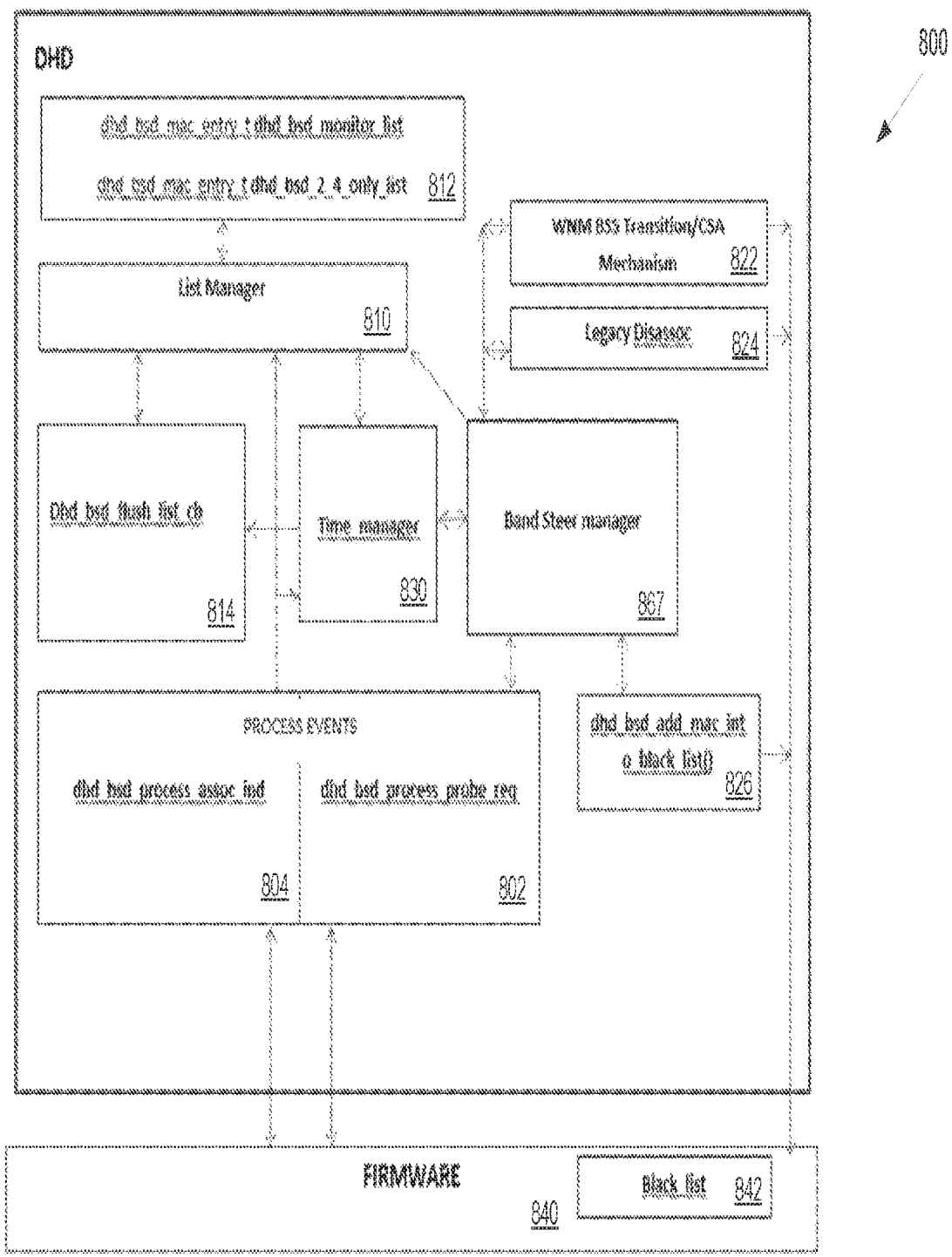
FIG. 8 is a block diagram of an example band-steering logic, as implemented by a band-steering controller, in one possible implementation.

FIG. 8 is a block diagram of an example band-steering logic 800 as may be implemented by a band-steering controller, in one possible implementation. The BSC 303, via BSM 867, may detect process events such as probe requests 802 and associations 804, and manage, using the List Manager 810, the monitor list for the second AP and the "first AP-only" list (legacy list) of devices incapable to connect to the second AP 812. The List Manager may also perform list flushing 814. The BSM 867 may be in communication with a time manager 830 (which may be implemented within the WLAN PMU 375, in one implementation). The BSM 820 may also manage generation of BSS transition requests 822 and dissociations 824 of devices capable of associating with the second AP but using first AP associations as a default option ("legacy devices"). The BSM 867 may also communicate with the firmware 840 and perform adding MAC addresses 826 to the black list 842 of the client devices to be denied access to the first AP.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context. "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method of operating a wireless network, comprising:
   receiving, by a controller including at least first and second access points (APs), a first probe request from a client device at the first AP operating at a first frequency range of the wireless network;
   establishing, by the controller, a first association between the first AP and the client device;
   sending, by the controller responsive to determining the first association is with the first AP, a transition request using the first AP to instruct the client device to transition to the second AP, wherein the second AP is a default AP, operating at a second frequency range of the wireless network, and having a second bandwidth that is different from a first bandwidth of the first AP; and establishing, by the controller, a second association between the second AP and the client device.

2. The method of claim 1, wherein the second bandwidth is greater than the first bandwidth and the second AP is the default AP of the controller regardless of a signal strength of the second AP.

3. The method of claim 1, further comprising:
determining, by the controller, a media access control (MAC) address of the client device;
storing, in a memory, the MAC address of the client device on a monitor list associated with the second AP;
receiving a second probe request from the client device at the second AP of the controller; and
verifying, by the controller prior to sending the transition request, that the second probe request is associated with a MAC address stored on the monitor list.

4. The method of claim 3, further comprising sending, by the controller, a de-authentication frame to the client device over the first AP and removing the MAC address of the client device from the monitor list.

5. The method of claim 4, further comprising adding, by the controller, the MAC address of the client device to a blacklist associated with the first AP.

6. The method of claim 1, wherein sending the transition request comprises sending a basic service set (BSS) transition request frame.

7. The method of claim 1, further comprising confirming, by the controller, that the client device has transitioned to the second AP.

8. The method of claim 1, further comprising disassociating, by the controller, the first association between the first AP and the client device.

9. The method of claim 1, further comprising determining, by the controller, a media access control (MAC) address of the client device and storing, in a memory, the MAC address of the client device on a blacklist associated with the first AP.

10. The method of claim 1, wherein the first AP comprises a first interface of a plurality of interfaces and the second AP comprises a second interface of the plurality of interfaces, wherein the plurality of interfaces comprises a 2.4 GHz interface and a 5 GHz interface.

11. A dual-band access system, comprising:
a dual-band radio including first and second access points (APs);
a memory; and
a processor configured to:
receive a first probe request from a client device over the first AP operating at a first frequency range of a wireless network;
establish a first association between the first AP and the client device;
send a transition request over the first AP, responsive to determining that the first association is with the first AP, to instruct the client device to transition to the second AP operating at a second frequency range of the wireless network, wherein the second AP a default AP of the dual-band radio and has a bandwidth that is different from a bandwidth of the first AP; and
establish a second association between the second AP and the client device.

12. The dual-band access system of claim 11, wherein the second AP is the default AP of the controller regardless of a signal strength of the second AP.

13. The dual-band access system of claim 11, wherein the bandwidth of the second AP is larger than the bandwidth of the first AP.

14. The dual-band access system of claim 11, wherein the processor is further configured to:
determine a media access control (MAC) address of the client device;
store the MAC address of the client device in the memory device on a monitor list associated with the second AP;
receive a second probe request from the client device over the second AP;
disassociate the first association between the first AP and the client device;
determine a media access control (MAC) address of the client device; and
store, in the memory, the MAC address of the client device on a blacklist associated with the first AP.

15. The dual-band access system of claim 14, wherein, prior to sending the transition request, the processor is to verify that the second probe request is associated with a MAC address stored on the monitor list; and wherein prior to disassociating the first association between the first AP and the client device, the processor is to verify that the second probe request is associated with a MAC address stored on the monitor list.

16. The dual-band access system of claim 15, wherein the dual-band radio comprises a media access controller and a physical layer, the physical layer configured to operate at the first and second frequency ranges of the wireless network.

17. The dual-band access system of claim 11, further comprising a second processor and a single-band radio, wherein the single-band radio comprises a personal area network link layer and a physical layer, the physical layer configured to operate at the first frequency range of the wireless network.

18. A system comprising:
a base station comprising a first dual-band radio and a processor; and
a client device comprising a second dual-band radio, wherein the client device is to:
send a first probe request at a first frequency range of the first dual-band radio;
establish a first association with a first access point (AP) of the base station, wherein the first AP corresponds to the first frequency range; and
send a second probe request at a second frequency range of the first dual-band radio;
and wherein the processor is to:
responsive to determining that the first association is with the first AP, send a transition request to the client device over the first AP, wherein the transition request comprises instruction for the client device to transition to a second AP of the base station, wherein the second AP corresponds to the second frequency range, and wherein the second AP is a default AP of the base station and have a bandwidth that is different from a bandwidth of the first AP; and
establish a second association with the second AP.

19. The system of claim 18, wherein the second AP is a default AP of the base station regardless of a signal strength of the second AP and the bandwidth of the second AP is larger than the bandwidth of the first AP.

20. The system of claim 18, wherein the processor is to disassociate the first association in response to establishing the second association.

21. The system of claim 18 wherein the first AP comprises a first interface of a plurality of interfaces and the second AP comprises a second interface of the plurality of interfaces, wherein the plurality of interfaces comprises a 2.4 GHz interface and a 5 GHz interface.

* * * * *